United States Patent [19]

Trissel et al.

[11] Patent Number: 5,341,320

[45] Date of Patent: Aug. 23, 1994

[54] METHOD FOR RAPIDLY PROCESSING FLOATING-POINT OPERATIONS WHICH INVOLVE EXCEPTIONS

[75] Inventors: David W. Trissel; Roderick L. Dorris; Stuart A. Werbner, all of Austin, Tex.

[73] Assignee: Motorola, Inc., Schaumburg, Ill.

[21] Appl. No.: 24,011

[22] Filed: Mar. 1, 1993

[51] Int. Cl.⁵ .................................................. G06F 7/38
[52] U.S. Cl. .................................... 364/748; 364/745; 364/736.5; 364/715.01
[58] Field of Search ............. 364/748, 745, 736, 736.5

[56] References Cited

PUBLICATIONS

"An Efficient Software Driver for Am9511 Arithmetic Processor Implementation", Furht et al., IEEE MICRO, Jun. 1984, pp. 7–19.

"VAX Floating Point: A Solid Foundation for Numerical Computation", by Payne et al., Electro/80 Conference Record, May 13–15 1980, pp. 18-1/1–12

"Compatible Software and Hardware Implementations Permitted by IEEE Standards for Binary Floating-point Arithmetic", AFIPS Conf. Proc., '84 Nat. Comp. Conf., pp. 101, 103–105.

"Architecture of the NS32580 Floating-point Controller", by Ben-Chorin, 1988 IEEE Compcon National Conference, pp. 213–217.

"High-performance Floating-point Coprocessor for the NS32532 CPU", by Iacobovici, Wescon 1988 Convention, pp. 1–6.

"Specifications for a Variable-Precision Arithmetic Coprocessor", by Hull et al., 10th IEEE Symp. on Computer Arithmetic 1991, pp. 127–131.

"Trap Architectures for LISP Systems", Johnson, Proc. of the 1990 ACM Conference on LISP and Functional Programming, pp. 79–86.

*Primary Examiner*—Stephen M. Baker
*Assistant Examiner*—Emmanuel Moise
*Attorney, Agent, or Firm*—Keith E. Witek

[57] ABSTRACT

A method for processing exception conditions in a floating-point system (40) begins by determining in hardware that an exception will occur (14) for a given floating-point operation and operand(s). After the hardware determines that an exception is to occur, an exception handler is invoked from software. The exception handler numerically alters the operands to create biased operands which may be processed by the hardware (20) via the given floating-point operation without creating another exception condition. The biased operands are then processed by the hardware via the given floating-point operation to produce a biased floating-point result. The biased floating-point result is unbiased (22) by the exception handler to achieve an unbiased result. The speed of floating-point exception handling is improved by using biasing techniques and both software and hardware to mathematically resolve floating-point exceptions to correct unbiased results.

26 Claims, 2 Drawing Sheets

METHOD FOR RAPIDLY PROCESSING FLOATING-POINT OPERATIONS WHICH INVOLVE EXCEPTIONS

FIELD OF THE INVENTION

The present invention relates generally to computer systems, and more particularly, to handling floating-point operation exceptions.

BACKGROUND OF THE INVENTION

The Institute of Electrical and Electronic Engineers (IEEE) frequently adopts standards for the integrated circuit community. IEEE has adopted a standard (IEEE standard 754-1985) regarding the handling of floating-point numbers and floating-point exceptions, such as underflow and overflow. In general, floating-point exceptions occur when unsupported operands types are encountered as inputs or would be the result of the operation.

In most cases, the exceptions are detected within the hardware. If detected exceptions are then completely processed in hardware, more complex hardware designs are required. This results in larger design times and longer time to market. The additional hardware required for exception handling consumes significant integrated circuit (IC) surface area. Increases in IC surface area is disadvantageous.

Another method of processing exception conditions involves using software algorithms to process exceptions. Once an exception condition is detected within the hardware floating-point unit, the microprocessor invokes a software program/routine to perform the floating-point operation which resulted in the hardware exception. The software algorithms which operate on a first floating-point operand and a second floating-point operand to produce a floating-point result are typically slow. For example, a floating-point multiply which is performed in hardware may take only one clock cycle or a few clock cycles to complete. In software, a floating-point multiply will typically consume tens or hundreds of clock cycles before completing. Therefore, handling exceptions exclusively in hardware or exclusively in software both have significant drawbacks.

SUMMARY OF THE INVENTION

The previously mentioned disadvantages are overcome and other advantages achieved with the present invention. In one form, the present invention comprises a method for applying a mathematical operation to a first floating-point value and a second floating-point value in a floating-point unit. The floating-point unit has a hardware operation unit and has access to an exception handler. The method begins by providing the first floating-point value and the second floating-point value to the floating-point unit. The mathematical operation which is required for the first floating-point value and the second floating-point value is determined. The hardware operation unit, the first floating-point value, and the second floating-point value are used to determine whether a floating-point exception is needed to process the mathematical operation using the first floating-point value and the second floating-point value. The exception handler is invoked to perform the mathematical operation on the first floating-point value and the second floating-point value when a floating-point exception is detected. The exception handler numerically alters the first floating-point value and the second floating-point value, respectively, to a biased first floating-point value and a biased second floating-point value. The biased first floating-point value and the biased second floating-point value are processed with the hardware operating unit to determine a biased result. The biased result is unbiased using the exception handler to obtain an unbiased result.

The present invention will be more clearly understood from the detailed description below in conjunction with the accompanying drawings.

DESCRIPTION OF A PREFERRED EMBODIMENT

Figure 1:
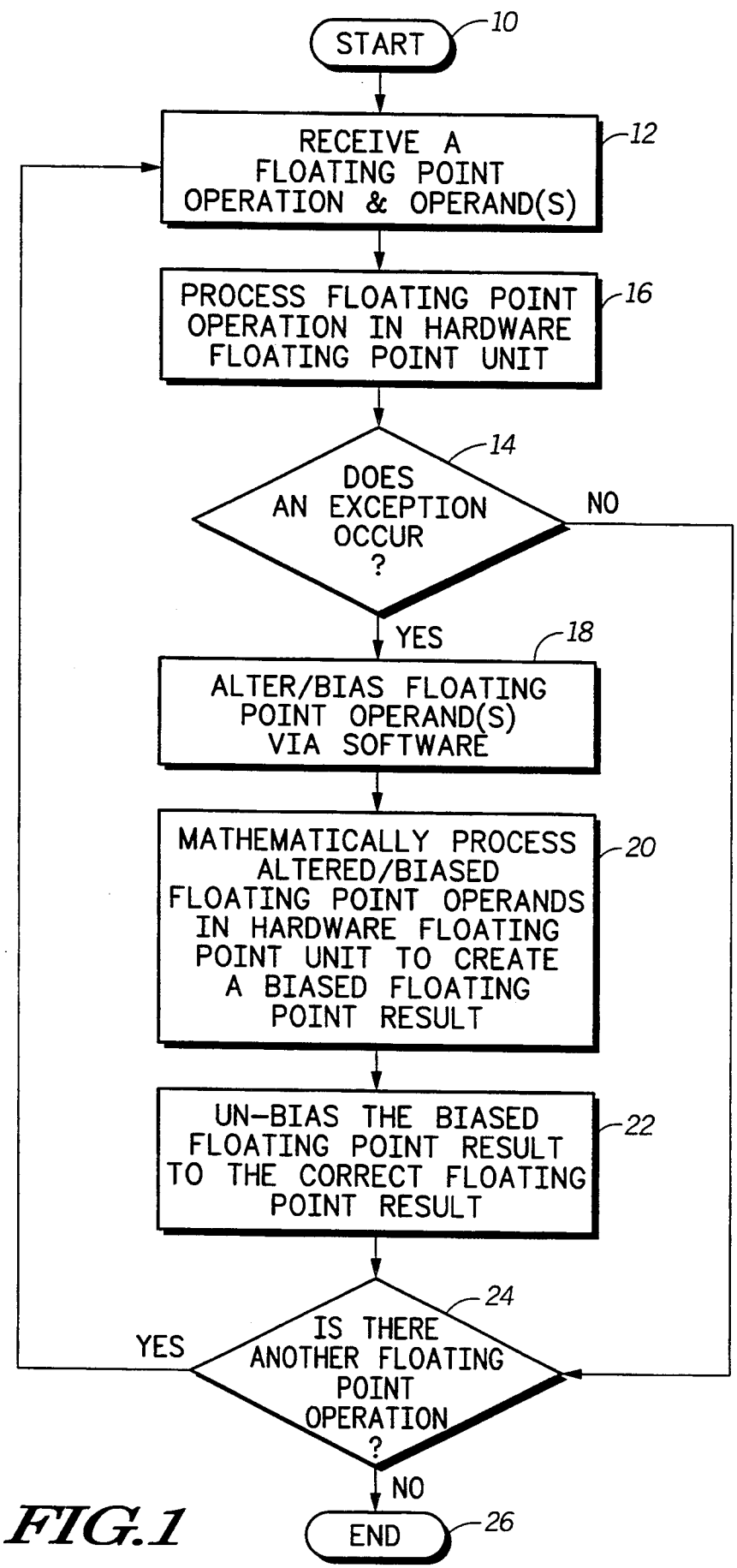
FIG. 1 illustrates in a flowchart a method for processing floating-point conditions in accordance with the present invention.

The method taught herein speeds the execution of floating-point operations which result in exceptions. When a hardware floating-point unit (FPU) has determined that a floating-point exception is to occur, an exception handler/routine is invoked. A floating-point exception may occur by multiplying two floating-point numbers together wherein the resulting floating-point product is outside the range which can be represented by the hardware floating-point unit. A division by zero will cause an exception. The addition or subtraction of two floating-point numbers resulting in a floating-point result outside the numerical range of the hardware results in an exception. A mathematical operation wherein one of the operands is representative of positive infinity or negative infinity may result in a floating-point exception. Mathematical processing involving a floating-point number which has limited mantissa or exponent precision may result in an exception condition. An exception may involve other known arithmetic operation conditions, such as the use of uninitialized values, or the involvement of any operand that has a value mathematically undefined for the operation. In general, any operation involving: positive infinity, negative infinity, a number divided by zero, not a number (NAN), a denormalized number, a number not having full mantissa precision, overflow, underflow, a unnormalized number, or a number not having full exponent precision, may result in an exception condition.

In general, floating-point exceptions occur whenever the hardware floating-point unit cannot process or is not designed to handle a floating-point operation on one or more floating-point values. In some cases, a floating-point operation may be processed by the hardware floating-point unit, but a result cannot be provided due to the hardware's design. This condition also results in a floating-point exception. In the art, an exception may also be referred to as an interrupt.

Once an exception is identified, the floating-point operands are numerically altered (i.e. biased) via an exception handler. This alteration is referred to as a pre-bias or pre-alteration operation. The exception handler is typically a software routine which is stored within the operating system of a data processor, the kernel of a data processor, a memory rot, a microprocessor memory system, microcode storage, or a like medium. Numerical alteration or biasing may be performed on one or more floating-point operands/values. Floating-point operands contain a mantissa value and an exponent value. For example, the number 1E23 (i.e. one times ten raised to the twenty-third power) has a mantissa equal to one and an exponent equal to twenty-three. The numerical alteration/biasing may involve the mantissa values and/or the exponent values.

The alteration/biasing via the exception handler results in biased/altered operands. The biased operands are numerically altered to ensure that the floating-point operation, when applied to the biased operands, may be processed by the hardware without creating another exception. The biased operands are then processed by the hardware floating-point unit to create a biased result which causes no exception. The biased result is then unbiased by the exception handler to result in the correct unbiased result. This unbiasing is referred to as a post-bias operation. The unbiased result is equal to the floating-point value which would have occurred if the hardware was designed and/or had enough precision to perform the operation via unbiased operands without an exception occurring. In other words, by using a software biasing and exception handing routine, hardware may quickly and correctly process floating-point numbers which are beyond its current capability. Due to the fact that the exception handling was performed partially in software and partially in hardware, speed advantages are achieved over pure software methods. Biasing and unbiasing numbers in software is quick and efficient, and the hardware executes mathematical operations faster than software-executed floating-point algorithms.

In general, biasing floating-point exception operands in software, re-processing biased exception operands properly in hardware, and unbiasing a biased hardware-generated result, has speed advantages with reduced hardware complexity. This software/hardware exception handling combination in conjunction with operand biasing is discussed in detail below.

In FIG. 1, a flowchart illustrates how to process a floating-point exception in a speedy, efficient manner by utilizing both hardware and software. FIG. 1 illustrates a starting step 10. In general, the method taught herein may be used in any electronic or electrical equipment that performs floating-point operations, such as data processors, microprocessors, computers, and the like. Step 10 may therefore involve starting to execute a program on a computer or running microcode on a microprocessor. In any case, a floating-point instruction will require execution via the hardware floating-point unit, also referred to as the hardware operation unit, the hardware mathematical computation system, floating-point mathematical unit, and the like.

In order to execute the floating-point instruction, the hardware floating-point unit receives at least one floating-point operation and at least one floating-point operand in step 12. Decoding or a relaying of control signals (not illustrated) from external to the hardware floating-point unit indicates to the hardware floating-point unit what operation is to be performed. Floating-point operations may include multiplication, division, addition, subtraction, complementing a value, absolute value, square root, and/or the like.

The hardware floating-point unit must determine whether a hardware floating-point exception will occur or is occurring in step 16. In order to determine if an exception is to occur, a numerical comparison of operands, comparison of parts of the operands, or an execution of the operation on the operands may be required. If no exception occurs, then the hardware floating-point unit provides the result in a conventional fashion via hardware in step 16.

If an exception is occurring (i.e. the hardware floating-point unit cannot handle the desired operation for some reason), then the step 18 is performed. In step 18 the exception handler is invoked to perform the floating-point operation due to the fact that the hardware cannot adequately handle the operation. The exception handler numerically alters or biases the floating-point operand or operands depending upon what operation is being performed. For example, if a subtraction results in a value which is too small of a number to be represented in the hardware, then the operands are increased in value by modifying the exponent, sign, and/or the mantissa to ensure that the hardware can process the subtraction operation. If a multiplication results in a number too large for the hardware to handle, the operands are reduced in numerical value such that the hardware can handle the multiplication request.

Therefore, depending upon the operands and the operation, biased operands or biased values are produced by the exception handler. These operands can be manipulated by the hardware floating-point unit via the operation without causing an exception. The biased values may be altered by adding, subtracting, multiplying, or dividing a constant from one of either the mantissa or the exponent (or both). The exception handler may also adjust the mantissa and the exponent to a predetermined fixed value or constant. For example, if multiplication overflow is to occur, the exception handler changes all exponents of the operands to the effective value of zero. In any case, the change in the mantissa and/or the exponent is stored/remembered by the exception handler. For example, if an exponent having a value of forty is altered to an exponent having the value of one, the handler stores that the exponent value was altered by a value of negative thirty-nine.

The biased operands are then transmitted back from the exception handler to the hardware floating-point unit and processed in a manner similar to step 16 via a step 20. Due to the fact that the operands are biased, no exception occurs and a valid biased result is output by the hardware in a timely manner (i.e. fractions of a clock cycle to a few clock cycles).

The biased result is transmitted to the exception handler in step 22. In step 22, the exception handler uses the information it stored pertaining to exponent, sign, and/or mantissa biasing to reverse the biasing and achieve a result which is unbiased. The unbiased result is the value which would have been calculated had the hardware floating-point unit been capable of handling the unbiased operands directly without an exception. Unbiasing to a proper value in software is possible because typically eight bits (for IEEE 754 single precision format) are used to represent an exponent in hardware, whereas in software more than eight bits (i.e. thirty-two bits) may be used to store an exponent. The same expansion of bits can be performed on the mantissa via the software exception handler for greater precision. Therefore, greater precision is achieved via software while the speed and efficiency of the hardware is also utilized. Overall, the exception handling capability is improved.

In a step 24, if one or more floating-point instructions require execution, then the process repeats via step 12.

If no further execution is required by the floating-point system, then the end of the algorithm is illustrated in a step 26.

Figure 2:
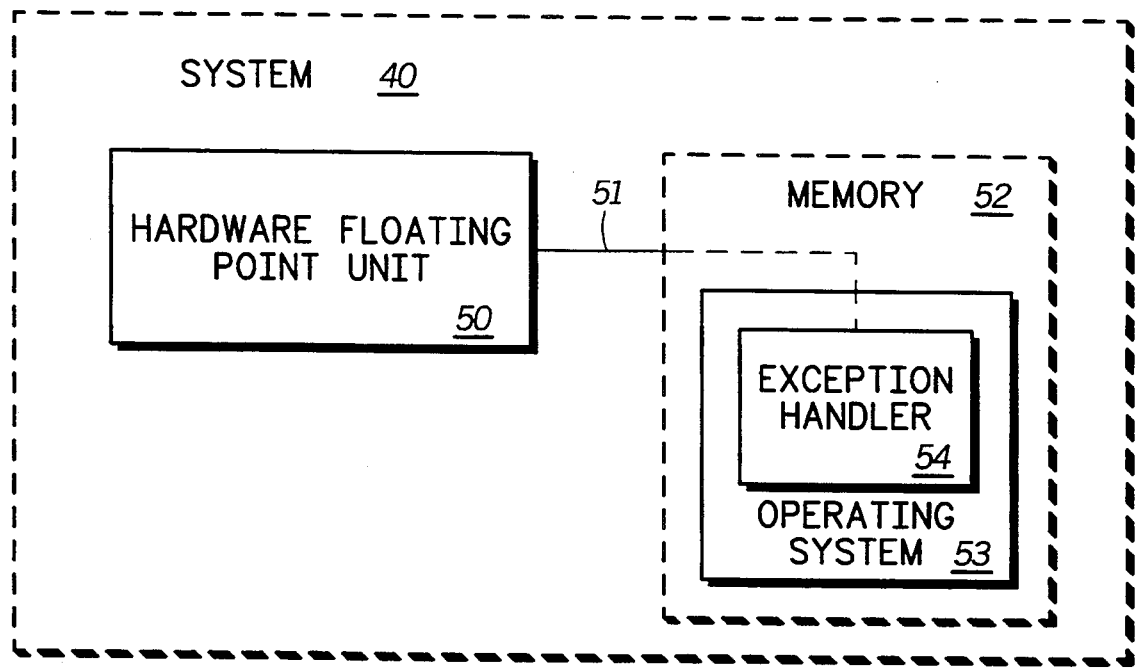
FIG. 2 illustrates in a block diagram a system which uses the method of FIG. 1 to process floating-point exception conditions in accordance with the present invention.

Illustrated in FIG. 2 is a floating-point system 40. System 40 may be a computer system, a supercomputer, a mainframe, a workstation, a microcontroller, a microprocessor, a data processor, or the like. A hardware floating-point unit 50 is illustrated as residing within system 40. The hardware floating-point unit 50 is a hardware system. A memory 52 is illustrated in FIG. 2, memory 52 may be a random access memory (RAM), a fast static random access memory (FSRAM), a dynamic random access memory (DRAM), a read only memory (ROM), an erasable programmable read only memory (EPROM), an electrically erasable programmable read only memory (EEPROM), a flash device, a magnetic storage device, a disk storage device, a combination of memory devices, and/or the like. An exception handler 54 resides in memory 52. At least one conductor 51 couples the exception handler 54 to the hardware floating-point unit 50. The memory, although illustrated as being internal to system 40, may optionally be a memory system which is external to the system 40. In addition, the exception handler 54 may either reside within an operating system 53 as illustrated in FIG. 2, or the exception handler may be independent from the operating system 53 in another embodiment (not illustrated).

Some examples of the method taught herein are discussed below. The following examples will assume that an IEEE 754 floating-point standard for single precision is used although any floating-point representation is applicable.

The Institute of Electrical and Electronic Engineers (IEEE) has adopted a standard for binary floating-point arithmetic (ANSI/IEEE Std 754-1985). This standard is commonly available and used by the integrated circuit industry. The IEEE single precision format represents a floating-point value similar to scientific notation (i.e. with a sign, exponent, and a mantissa). For normalized numbers, the exponent is taken to be a power of two with values ranging from −126 to +127. This exponent value is actually represented in a biased form with values ranging from 1 to 254. The mantissa is functionally a binary fractional number with an assumed binary units position of one proceeding the fractional part. The assumed binary units position of one is sometimes referred to as a hidden bit. A floating-point value may be represented as follows:

$$(-1)^s \cdot 2^{(exp-bias)} \cdot 1.mantissa$$

or

| s | eeeeeeee | mmmmmmmmmmmmmmmmmmmmmmm |
|---|----------|-------------------------|
| s | exp | mantissa | wherein:
· indicates multiplication
s indicates the sign bit (0=positive, 1=negative)
exp indicates the exponent value (8 bits)
mantissa indicates the mantissa fraction (23 bits)
bias=127 in IEEE 754 single precision format The value of "1." placed before the mantissa represents the hidden bit and an implied binary point, neither of which is actually represented in the format.

In a first example, a multiply of two source operands is performed using the single precision format which is specified by the IEEE 754 standard. The IEEE 754 standard states that when overflow or underflow exceptions are disabled, the final result must be the correctly multiplied mantissa value with the exponent reduced or biased to a pre-specified value. This adjustment to the exponent allows the number to be represented in an 8-bit exponent field regardless of how large the exponent becomes during a floating-point operation.

In floating-point mathematics based upon the IEEE 754 standard, the values of the exponents of two floating-point numbers are added when the two floating-point numbers are multiplied together. Assume that there are two operands, an operand A and an operand B input into the floating-point system of FIG. 2 or the floating-point algorithm of FIG. 1. The operands A and B in bit form are:

| Sign | Exp | Mantissa |
|------|-----|----------|
| 0 | 11001111 | 10001000100010001000101 (operand A) |
| 0 | 11000001 | 01010101010101010101010 (operand B) |

The operands A and B cannot be properly multiplied by the hardware due to the fact that the resulting exponent will overflow. In other words, the exponent of operand A plus the exponent of operand B is larger than the required 8-bit exponent field. Therefore, an exception is generated by the hardware.

The exception handler is invoked and the exponents are biased in the case of multiplication. In this example, the exponents are biased to the selected constant exponent value of zero. Due to the fact that ($2^0=1$), the exponent being set to zero effectively sets the floating-point operands to numbers in the range greater than or equals to one and less than two. A zero exponent value is represented as an exponent having the biased binary representation 01111111. Therefore, operands A and B are altered via the exception handler to:

| Sign | Exp | Mantissa |
|------|-----|----------|
| 0 | 01111111 | 10001000100010001000101 (operand A) |
| 0 | 01111111 | 01010101010101010101010 (operand B) |

The exception handler stores the difference between 01111111 and 11000001 for the exponent of operand A, and stores the difference between 01111111 and 11000001 for the exponent of operand B. These stored values are referred to as the modification values and represent what value was added to each exponent value to result in an exponent value of 01111111.

The hardware can quickly multiply the two mantissa values and not result in an exception when the exponents are 01111111. The biased operands A and B are therefore sent to the hardware, multiplied, and the resulting exponent does not overflow the allowed eight exponent bits. A biased result is output to the exception handler. The modification values are then added back into the biased result via the exception handler or an adder circuit coupled to the exception handler to obtain an unbiased result.

In general, a number X and a number Y are multiplied, wherein X and Y are floating-point values. Due to the fact that sign bits are processed by an independent exclusive OR (XOR) operation for multiplication and divide operations, the sign bit is inconsequential for this operation (unlike for addition and subtraction). The following equations mathematically illustrate the method taught in this example:

result=$X \cdot Y$ result=$(2^{expx} \cdot \text{mantissa\_}x) \cdot (2^{expy} \cdot \text{mantissa\_}y)$ result=$(2^{expx} \cdot 2^0 \cdot \text{mantissa\_}x) \cdot (2^{expy} \cdot 2^0 \cdot \text{mantissa\_}y)$ result=$(2^{expx+expy}) \cdot (2^0 \cdot \text{mantissa\_}x) \cdot (2^0 \cdot \text{mantissa\_}y)$ resulting in:

result=$X' \cdot Y'$ wherein $X' = (2^{expx+expy})$ and $Y' = (2^0 \cdot \text{mantissa\_}x) \cdot (2^0 \cdot \text{mantissa\_}y)$ Y' is performed in a fast exception-free manner by the hardware. Y' illustrates the multiplication of the biased floating-point values. X' illustrates the addition of the exponent values which is achieved in software via proper storage and processing of the modification values in the exception handler. The advantage is that the result is achieved in a fast manner by using both hardware and software to handle a floating-point exception. The exponent may be properly modified (i.e. biased) to fit in an eight bit field to be compatible with the IEEE 754 overflow format.

A second example involves the fact that the IEEE 754 standard supports "tiny" numbers. Tiny numbers are also called denormalized numbers. Denormalized numbers are recognized as having an exponent field containing all zeros. Denormalized numbers are mathematically represented as $(-1)^s \cdot 2^{-126} \cdot 0.\text{mantissa}$ Notice that the hidden 1 has been replaced by a hidden 0. Therefore, very small numbers which are less than $1 \cdot 2^{-126}$ may be represented in a floating-point value. Many IEEE 754 arithmetic processors cannot directly handle these denormalized numbers due to the fact that denormalized numbers are a special case.

Assume that the following floating-point values are being multiplied:

| Sign | Exp | Mantissa | |
|---|---|---|---|
| 0 | 10001111 | 10001000100010001000101 | (operand A) |
| 0 | 00000000 | 00000101010101010101010 | (operand B) |

Operand B is a denormalized number due to the 00000000 exponent. This operand is rejected by the hardware unit and an exception occurs. The small number is then biased to appear as a normal IEEE 754 floating-point number by the exception handler and a biased result can be achieved quickly via the hardware.

The denormalized number is first converted to a normalized number by shifting the mantissa to the left until a non-zero bit (i.e. a one bit) is shifted out the left of the manfissa to become the hidden bit. The count of the total number of bits shifted out, referred to as a kshift value, is determined and stored by the exception handler. The kshift value is used in a manner similar to the modification values to obtain an unbiased result from a biased result. Each left shift is equivalent to multiplying the mantissa by two. Each left shift can therefore be subsequently compensated for via the exception handler by adjusting the exponent value down by one (i.e. subtracting one from the exponent). The exponent is a representation of a power of two (i.e. $2^{exp}$). The operands after modification appear as follows:

| Sign | Exp | Mantissa | |
|---|---|---|---|
| 0 | 10001111 | 10001000100010001000101 | (operand A) |
| 0 | 00000000 | 01010101010101010000000 | (operand B) | wherein kshift=2 for operand B.

The arithmetic representation of this process is illustrated below:

$(-1)^s \cdot 2^{-126} \cdot 0.\text{mantissa}$ (operand B)

$(-1)^s \cdot 2^{-126} \cdot 1.\text{shifted\_mantissa} \cdot 2^{-kshift}$ (operand B)

$(-1)^s \cdot 2^{-126-kshift} \cdot 1.\text{shifted\_mantissa}$ (operand B)

The resulting final equation above looks similar to a normalized IEEE 754 standard number. The exponents are then changed to the value of zero (i.e. 01111111 in binary) resulting in:

| Sign | Exp | Mantissa | |
|---|---|---|---|
| 0 | 01111111 | 10001000100010001000101 | (operand A) |
| 0 | 01111111 | 01010101010101000000000 | (operand B) |

By setting the exponents to a value of zero, modification values are determined. Now, the hardware can multiply the operands A and B without causing an exception. A biased floating-point result is attained as taught in the first example illustrated above.

The unbiased result is attained by modifying the exponent via the modification values stored via the exception handler. In addition, the kshift value must be used to alter the exponent value as taught herein.

The arithmetic analysis of multiplication by a denormalized number is presented below:

result=$X \cdot Y$ result=$(2^{expx} \cdot \text{mantissa\_}x) \cdot (2^{-126-kshift} \cdot \text{mantissa\_}y)$ result=$(2^{expx} \cdot 2^0 \cdot \text{mantissa\_}x) \cdot (2^{-126-kshift} \cdot 2^0 \cdot \text{mantissa\_}y)$ result=$(2^{expx-126-kshift}) \cdot (2^0 \cdot \text{mantissa\_}x) \cdot (2^0 \cdot \text{mantissa\_}y)$ resulting in:

result=$X' \cdot Y'$ wherein $X' = (2^{expx-126-kshift})$ $Y' = (2^0 \cdot \text{mantissa\_}x) \cdot (2^0 \cdot \text{mantissa\_}y)$.

The result calculation illustrated above is similar to the first example of multiply overflow. Underflow is handled as required by the IEEE 754 standard.

A method has been taught herein where biasing and unbiasing of floating-point numbers in software allows improved utilization of hardware floating-point units.

The increased utilization increases system performance over conventional floating-point systems.

It is important to note that three or more biases may occur within a floating point value. When using the IEEE 754 single precision format, the exponent values are biased to create exponents in the range of −126 to +127 given the values of 0 to 254. When using the IEEE 754 format, exponents of the final result are biased by 192 if an overflow result occurs. This bias by 192 allows the result to be represented in the 32-bit IEEE format. The methods taught herein use a dynamic third bias/alteration/adjustment which only occurs when an exception condition results. Once an exception condition results, one or more floating point operands are biased to one or more biased values which ensure that no exception will occur in the floating point unit. The bias is then taken out of the biased result to form an unbiased result.

While the present invention has been illustrated and described with reference to specific embodiments, further modifications and improvements will occur to those skilled in the art. For example, any floating-point standard or representation may be applied to the method taught herein. The exception handler or exception routine, as discussed herein, may be performed in software, microcode, hardware, or a combination of any of the above enumerated media. The floating point unit taught herein may be a software routine or a hardware circuit. The interconnects taught herein may be a wire, a plurality of wires, an electrical bus, an optical interconnect, or the like.

Even though multiplication examples were presented herein, any operation, such as division, addition, subtraction, complementing, square root, and the like, may be processed by the method taught herein. Furthermore, some data processors, such as digital signal processors (DSPs), are designed to perform extended/enhanced floating-point operations. Some enhanced operations include multiply and accumulate commands, and other multi-function floating-point operations performed in a single instruction. These enhanced operations may also be applied to the method taught herein. Biasing, as taught herein, may be performed in a relative manner, such as addition, subtraction, multiplication, division, or may require that portions of operands be set to a predetermined constant value. The method taught herein will work for any number of operands. Other commands may use the methods taught herein, such as square root, a comparison, a conversion between number formats (i.e. floating-point to integer conversion), absolute value, negate, and the like. It is to be understood, therefore, that this invention is not limited to the particular forms illustrated and that it is intended in the appended claims to cover all modifications that do not depart from the spirit and scope of this invention.

We claim:

1. A method for applying a mathematical operation to a floating-point value in a floating-point unit wherein the floating-point unit has a hardware operation unit and has access to an exception handler, the method comprising the steps of:

providing the floating-point value to the floating-point unit;

determining within the floating point unit, the mathematical operation which is required for the floating-point value;

determining, using the hardware operation unit and the floating-point value, whether a floating-point exception is needed to process the mathematical operation using the floating-point value;

invoking the exception handler to perform the mathematical operation with the floating-point value when a floating-point exception is detected, the exception handler numerically altering the floating-point value to a biased floating-point value and processing the biased floating-point value with the hardware operating unit to determine a biased result; and unbiasing the result using the exception handler.

2. The method of claim 1 wherein the floating-point value has a first mantissa value and a first exponent value and the step of invoking the exception handler comprises:

numerically altering the floating-point value to the biased floating-point value by altering a value selected from a group consisting of: the first mantissa value and the first exponent value.

3. The method of claim 1 wherein the step of invoking the exception handler comprises:

processing the floating-point value to create the biased floating-point value by performing a selected operation to the floating-point value, said selected operation being selected from a group consisting of: addition, subtraction, multiplication, and division.

4. The method of claim 1 wherein the hardware operation unit is electrically coupled to an operating system and the step of invoking the exception handler comprising:

altering the floating-point value to a biased floating-point value by invoking the exception handler which resides within said operating system.

5. The method of claim 1 wherein the step of invoking the exception handler further comprises:

storing the exception handler within a memory system.

6. The method of claim 1 wherein the step of determining, using the hardware operation unit and the floating-point value comprises:

determining that an exception is needed if the mathematical operation encounters a number selected from the group consisting of: positive infinity, negative infinity, a number divided by zero, not a number (NAN), a denormalized number, a number not having full mantissa precision, an overflow number, an underflow number, an unnormalized number, a result out of range, a result out of range, and a number not having full exponent precision.

7. The method of claim 1 wherein the step of invoking the exception handler comprises:

altering the floating point value to have a selected constant exponent value.

8. The method of claim 1 wherein the step of providing the floating-point value to the floating-point unit comprises:

providing both a first floating-point and a second floating-point value to the floating-point unit.

9. A method for performing a mathematical operation on a first floating-point number and a second floating-point number on a floating-point system wherein the floating-point system has a hardware mathematical computation system having at least one memory device which stores a floating-point exception handler, the method comprising the steps of:

determining with the hardware mathematical computation system that the mathematical operation which is to be performed on the first floating-point number and the second floating-point number requires a hardware floating-point exception;

invoking the floating-point exception handler when a hardware floating-point exception is required, the floating-point exception handler altering the first floating-point number and the second floating-point number, respectively, to a biased first floating-point number and a biased second floating-point number, wherein the mathematical operation can be performed in the hardware mathematical computation system on the biased first floating-point number and the biased second floating-point number without resulting in another hardware floating-point exception;

computing a biased floating-point result with the hardware mathematical operation system by applying the mathematical operation to the biased first floating-point number and the biased second floating-point number; and altering the biased floating-point number with the floating-point exception handler to produce an unbiased floating-point result.

10. The method of claim 9 wherein the first floating-point number has a first mantissa value and a first exponent value, and the second floating-point number has a second mantissa value and a second exponent value, and the step of invoking the floating-point exception handler comprises:

numerically altering the first floating-point number to the biased first floating-point number by altering a value selected from a group consisting of: the first mantissa value and the first exponent value; and numerically altering the second floating-point number to the biased second floating-point number by altering a value selected from a group consisting of: the second mantissa value and the second exponent value.

11. The method of claim 9 wherein the step of invoking the floating-point exception handler comprises:

processing the first floating-point number to the biased first floating-point number by performing a first selected operation to the first floating-point number, said first selected operation being selected from a group consisting of: addition, subtraction, multiplication, and division; and processing the second floating-point number to the biased second floating-point number by performing a second selected operation to the second floating-point number, said second selected operation being selected from a group consisting of: addition, subtraction, multiplication, and division.

12. The method of claim 9 wherein the hardware mathematical computation system is electrically coupled to an operating system and the step of invoking the floating-point exception handler comprising:

altering the first floating-point number and the second floating-point number respectively to a biased first floating-point number and a biased second floating-point number by invoking the floating-point exception handler which resides within said operating system.

13. The method of claim 9 wherein the step of invoking the floating-point exception handler comprises:

altering the first floating-point number to a first selected constant exponent value; and altering the second floating-point number to a second selected constant exponent value.

14. The method of claim 13 wherein the step of altering the first floating-point number and the step of altering the second floating-point number each comprise using a constant exponent value wherein the first selected constant exponent value and the second selected constant exponent value are equal.

15. A method for performing floating-point operations and resolving at least one floating-point exception within a floating-point system wherein the floating-point exception results from a hardware system portion of the floating-point system being unable to perform a selected floating-point operation, said method comprising the steps of:

receiving a first unbiased mathematical floating-point value;

receiving a second unbiased mathematical floating-point value;

determining that the first unbiased mathematical floating-point value and the second unbiased mathematical floating-point value cannot be properly processed by the hardware system portion using the selected floating-point operation;

providing the first unbiased mathematical floating-point value and the second unbiased mathematical floating-point value to a biasing routine which biases the first unbiased mathematical floating-point value to a first biased mathematical floating-point value and biases the second unbiased mathematical floating-point value to a second biased mathematical floating-point value;

transmitting the first biased mathematical floating-point value from the biasing routine to the hardware system portion;

transmitting the second biased mathematical floating-point value from the biasing routine to the hardware system portion;

performing the selected floating-point operation on the first biased mathematical floating-point value and the second biased mathematical floating-point value in the hardware system portion to provide a biased floating-point result; and altering the biased floating-point result to provide an unbiased floating-point result.

16. The method of claim 15 wherein the first unbiased mathematical floating-point value has a first mantissa value and a first exponent value, and the second unbiased mathematical floating-point value has a second mantissa value and a second exponent value, and the step of providing the first unbiased mathematical floating-point value and the second unbiased mathematical floating-point value to a biasing routine comprises:

numerically altering the first unbiased mathematical floating-point value to the first biased mathematical floating-point value by altering a value selected from a group consisting of: the first mantissa value and the first exponent value; and numerically altering the second unbiased mathematical floating-point value to the second biased mathematical floating-point value by altering a value selected from a group consisting of: the second mantissa value and the second exponent value.

17. The method of claim 15 wherein the step of providing the first unbiased mathematical floating-point value and the second unbiased mathematical floating-point value to a biasing routine comprises:

processing the first floating-point value to the biased first floating-point value by performing a first selected operation to the first floating-point value, said first selected operation being selected from a group consisting of: addition, subtraction, multiplication, division, and altering the first floating-point value to a selected constant exponent value; and processing the second floating-point value to the biased second floating-point value by performing a second selected operation to the second floating-point value, said second selected operation being selected from a group consisting of: addition, subtraction, multiplication, division, and altering the first floating-point value to a selected constant exponent value.

18. The method of claim 15 wherein the hardware operation unit is electrically coupled to an operating system and the step of providing comprises:

altering the first floating-point value and the second floating-point value, respectively, to a biased first floating-point value and a biased second floating-point value by invoking an exception handler which resides within said operating system.

19. The method of claim 15 wherein the step of determining comprises:

determining that an exception is needed if the selected floating-point operation encounters a number selected from the group consisting of: positive infinity, negative infinity, divide by zero, not a number (NAN), a denormalized number, a number not having full mantissa precision, an overflow number, an underflow number, a result out of range, and number not having full exponent precision.

20. A method for processing a floating-point operation with a floating-point system, the floating-point system having a floating-point mathematical unit and an exception handler, the method comprising the steps of:

providing a first floating-point operand to the floating-point mathematical unit;

using the floating-point mathematical unit to determine that the floating-point operation results in an exception which cannot be correctly processed within said floating-point mathematical unit;

biasing the first floating-point operand to a first biased floating-point operand within the exception handler; and calculating a biased floating-point result from the first biased floating-point operand within the floating-point mathematical unit.

21. The method of claim 20 wherein the first floating-point operand has a first mantissa value and a first exponent value and said step of biasing comprises:

numerically altering the first floating-point operand to the biased first floating-point operand by altering a value selected from a group consisting of: the first mantissa value and the first exponent value.

22. The method of claim 20 wherein the step of biasing comprises:

processing the first floating-point operand to the biased first floating-point operand by performing a first selected operation to the first floating-point operand, said first selected operation being selected from a group consisting of: addition, subtraction, multiplication, shifting, and division.

23. The method of claim 20 further comprising:

storing the exception handler within a memory system.

24. The method of claim 20 wherein the step of biasing comprises:

altering the first floating-point operand to a constant exponent value.

25. The method of claim 20 wherein the step of using the floating-point mathematical unit to determine that the floating-point operation results in an exception, comprises:

determining that an exception is needed if the floating-point operation encounters a number selected from the group consisting of: positive infinity, negative infinity, a number divided by zero, not a number (NAN), a denormalized number, a number not having full mantissa precision, an overflow number, an unnormalized number, an underflow number, a result out of range, and a number not having full exponent precision.

26. The method of claim 20 further comprising a step of:

providing a second floating-point operand to the floating-point mathematical unit.

* * * * *